(12) United States Patent
Elko et al.

(10) Patent No.: US 9,302,920 B1
(45) Date of Patent: Apr. 5, 2016

(54) INTEGRATED CONTROLLER AND METHOD FOR A WATER FILTRATION SYSTEM

(75) Inventors: Daniel Scott Elko, Milwaukee, WI (US); David J. Averbeck, Dousman, WI (US)

(73) Assignee: Pentair Residential Filtration, LLC, Glendale, WI (US)

( * ) Notice: Subject to any disclaimer, the term of this patent is extended or adjusted under 35 U.S.C. 154(b) by 1863 days.

(21) Appl. No.: 11/391,713

(22) Filed: Mar. 28, 2006

(51) Int. Cl.
| | |
|---|---|
| *C02F 1/44* | (2006.01) |
| *B01D 35/12* | (2006.01) |
| *C02F 1/00* | (2006.01) |
| C02F 1/42 | (2006.01) |
| C02F 5/00 | (2006.01) |

(52) U.S. Cl.
CPC ............... *C02F 1/008* (2013.01); *B01D 35/12* (2013.01); *B01D 2321/40* (2013.01); *C02F 1/42* (2013.01); *C02F 1/444* (2013.01); *C02F 5/00* (2013.01); *C02F 2209/40* (2013.01); *C02F 2209/44* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 3,992,301 | A * | 11/1976 | Shippey et al. | 210/636 |
| 4,162,973 | A * | 7/1979 | Lynch | 210/744 |
| 5,387,348 | A * | 2/1995 | Hagiwara et al. | 210/662 |
| 5,503,735 | A * | 4/1996 | Vinas et al. | 210/87 |
| 5,871,652 | A * | 2/1999 | England et al. | 210/741 |
| 6,074,551 | A * | 6/2000 | Jones et al. | 210/106 |
| RE37,759 | E * | 6/2002 | Belfort | 210/636 |
| 6,868,690 | B2 * | 3/2005 | Faqih | 62/291 |
| 2002/0027111 | A1 * | 3/2002 | Ando et al. | 210/791 |

* cited by examiner

*Primary Examiner* — Terry Cecil
(74) *Attorney, Agent, or Firm* — Quarles & Brady LLP

(57) ABSTRACT

Integrated controller and method for a water filtration system. The system can include a membrane filter, a valve coupled to the membrane filter, and a water softener and/or a media filter. The filtration system can include a controller coupled to membrane filter and coupled to the water softener and/or the media filter. The controller can include a flow meter and a switch. The flow meter can be coupled to the membrane filter and the water softener and/or the media filter. The switch can be electrically connected to the valve. In some embodiments, the controller can cause the switch to flush the membrane filter only when the water softener and/or the media filter is not being regenerated.

17 Claims, 6 Drawing Sheets

INTEGRATED CONTROLLER AND METHOD FOR A WATER FILTRATION SYSTEM

BACKGROUND OF THE INVENTION

Water filtration systems often include two or more different filtration or water softener units that are sold and installed separately. These units can include a membrane filter (i.e., for filtering solids such as microbiological contaminants, also referred to as ultrafiltration or microfiltration), a water softener (i.e., for ion exchange), and a media filtration unit (i.e., for filtering dissolved solids or organic compounds). Each of the filtration and water softener units generally includes its own controller to control the flushing of the filtration unit, the regeneration of the water softener unit, and various other functions of the filtration system.

SUMMARY OF THE INVENTION

In some embodiments, the invention can provide a filtration system including a membrane filter, a valve coupled to the membrane filter, and a water softener and/or a media filter. The filtration system can include a controller coupled to membrane filter and coupled to the water softener and/or the media filter. The controller can include a flow meter and a switch. The flow meter can be coupled to the membrane filter and the water softener and/or the media filter. The switch can be electrically connected to the valve. The controller can cause the switch to close in order to flush the membrane filter only when the water softener and/or the media filter are not being regenerated. In some embodiments, the valve can be a solenoid flush valve. In some embodiments, the switch can be a relay. In some embodiments, the water softener and the media filter can be combined in one vessel.

Embodiments of the invention provide a method of controlling a filtration system including electrically connecting a controller to a first valve fluidly coupled to a membrane filter and to a second valve fluidly coupled to at least one of a water softener and a media filter, and fluidly coupling a flow meter to the membrane filter and the at least one of the water softener and the media filter. The method can also include monitoring at least one of flow and time, flushing the membrane filter based on at least one of flow and time, and regenerating the at least one of the water softener and the media filter based on at least one of flow and time.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings, whether direct or indirect.

Figure 1:
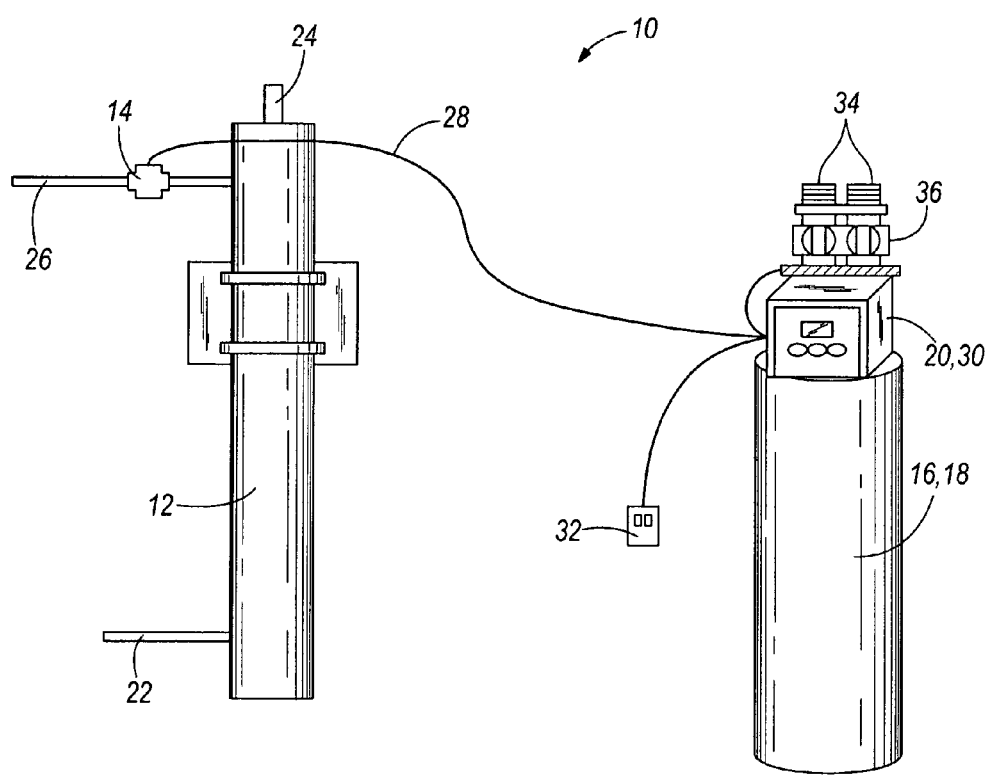
FIG. 1 is a schematic illustration of a filtration system according to one embodiment of the invention.

FIG. 1 illustrates a filtration system 10 including a membrane filter 12, a valve 14 (e.g., a solenoid flush valve), a water softener 16 and/or a media filter 18, and a controller 20. Unfiltered water can enter the membrane filter 12 through an inlet 22. Filtered water can exit the membrane filter 12 through an outlet 24. Waste water used to flush the membrane filter 12 can exit the membrane filter 12 through a drain 26. The valve 14 can be fluidly coupled to the drain 26. The valve 14 can also be electrically connected to the controller 20 by a connection 28. The controller 20 can include a flow meter 30. The flow meter 30 of the controller 20 can be fluidly coupled to both the membrane filter 12 and the water softener 16 and/or the media filter 18. In some embodiments, the water softener 16 and the media filter 18 can be included in a single vessel or housing. The controller 20 can be connected to a transformer 32 in order to be connected to a power source. The water softener 16 and/or the media filter 18 can include in/out connections 34. In some embodiments, the water softener 16 and/or the media filter 18 can include a bypass 36.

Figure 2:
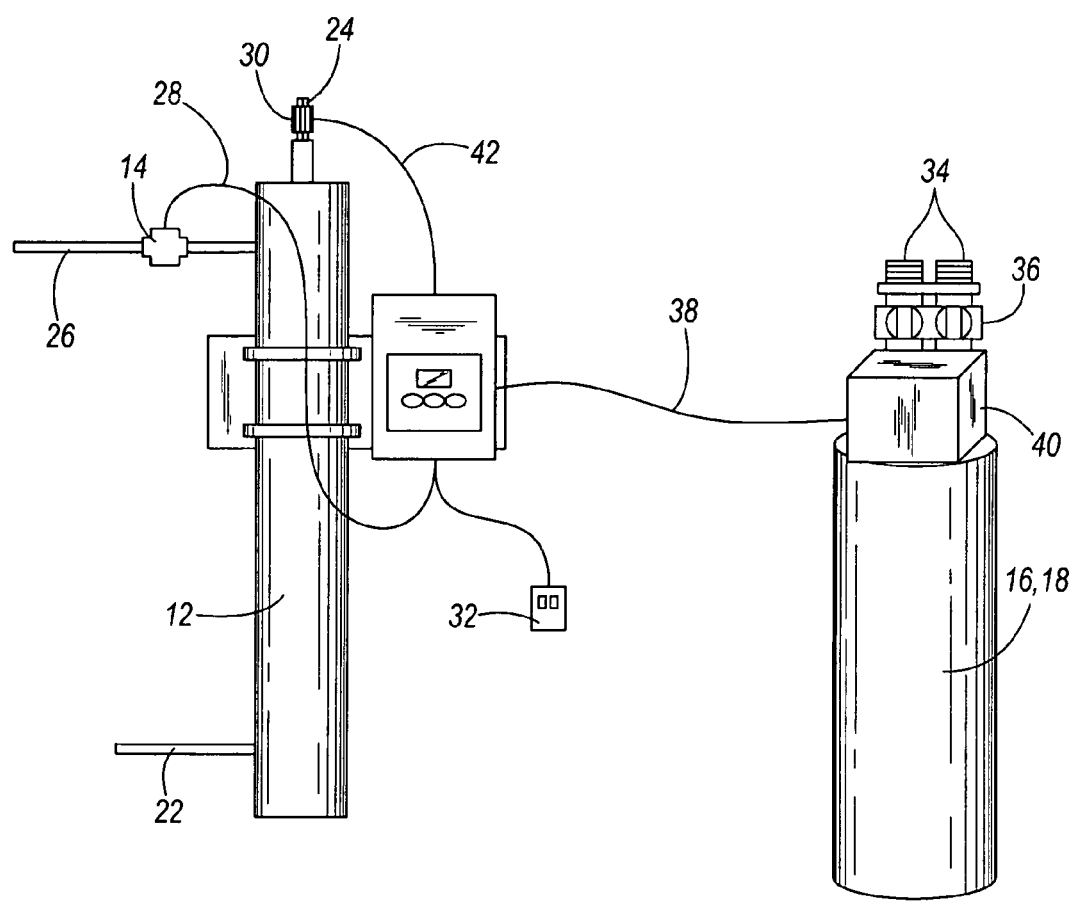
FIG. 2 is a schematic illustration of a filtration system according to another embodiment of the invention.

As shown in FIG. 1, the controller 20 can be coupled to the water softener 16 and/or the media filter 18. However, as shown in FIG. 2, some or all portions of the controller 20 can alternatively be coupled to the membrane filter 12. In one embodiment, as shown in FIG. 2, the controller 20 can be electrically connected to a valve actuator 40 coupled to the water softener 16 and/or the media filter 18 by a connection 38. The controller 20 can provide a control signal to the valve actuator 40 via the connection 38. As also shown in FIG. 2, the flow meter 30 can be coupled to the outlet 24 of the membrane filter 12. The flow meter 30 can be electrically connected to the controller 20 by a connection 42.

The membrane filter 12 can be an ultrafiltration device and/or a microfiltration device for filtering solids, such as microbiological contaminants, including viruses and bacteria. The membrane filter 12 can remove particles having a size of less than about one tenth of a micron. The membrane filter 12 can include a pressure vessel and filtration media inside of the pressure vessel. The membrane filter 12 can be a capillary-style membrane filter 12 with the filtration media including bundles of hollow fibers that can be cleaned by periodic flushing. The unfiltered water can enter the hollow fibers either from the outside or the inside of each hollow fiber, which generally only affects which side of the hollow fibers must be flushed. Suspended solids can be flushed from the surface of the hollow fibers (or from the surfaces of other types of membranes).

The water softener 16 can include an ion exchange vessel. The water softener 16 can include a nitrate removal system. The media filter 18 can include a carbon filter and/or an iron filter. In some embodiments, the water softener 16 and the media filter are included in a single vessel or housing. For example, a pressure vessel can be partially filled with ion exchange material and partially filled with filtration media.

The controller 20 can include a flow meter. The flow meter can be coupled to the membrane filter 12 and the water softener 16 and/or the media filter 18. The flow meter can include a paddle wheel, a turbine, or another suitable flow-sensing device. In some embodiments, the flow meter can be fluidly coupled in series with the membrane filter 12 and the water softener 16 and/or the media filter 18. In some embodiments, for every predetermined number of gallons of flow, the controller 20 can cause the membrane filter 12 to be flushed for a predetermined time period.

The controller 20 can include a timer circuit. The controller 20 can cause the water softener 16 and/or the media filter 18 to be regenerated based on a timer signal from the timer circuit. In some embodiments, the controller 20 can also use the timer signal to control the switch and the flushing of the membrane filter 12. The controller 20 can be used to a valve to the water softener 15 and/or media filter 18 to periodically clean and regenerate the ion exchange and/or filtration media based on the accumulated flow and/or time as determined from the flow meter and the timer circuit.

The switch (e.g., a relay) can be electrically connected to the valve 14. The controller 20 can cause the switch to flush the membrane filter 12. In some embodiments, the controller 20 can cause the switch to close only when the water softener 16 and/or the media filter 18 is not being regenerated in order to ensure that adequate water is available for proper operation of both systems. The controller 20 can cause the switch to close, in order to flush the membrane filter 12, based entirely or in part on a flow signal from the flow meter. In some embodiments, the controller 20 can monitor the accumulated time and/or the flow since the last flushing and can periodically open the valve proportionally to the accumulated time and/or the flow.

In some embodiments, the controller 20 can include a single processor (such as a suitable microprocessor), a single flow meter, and a single transformer for the membrane filter 12 and the water softener 16 and/or the media filter 18.

Figure 3:
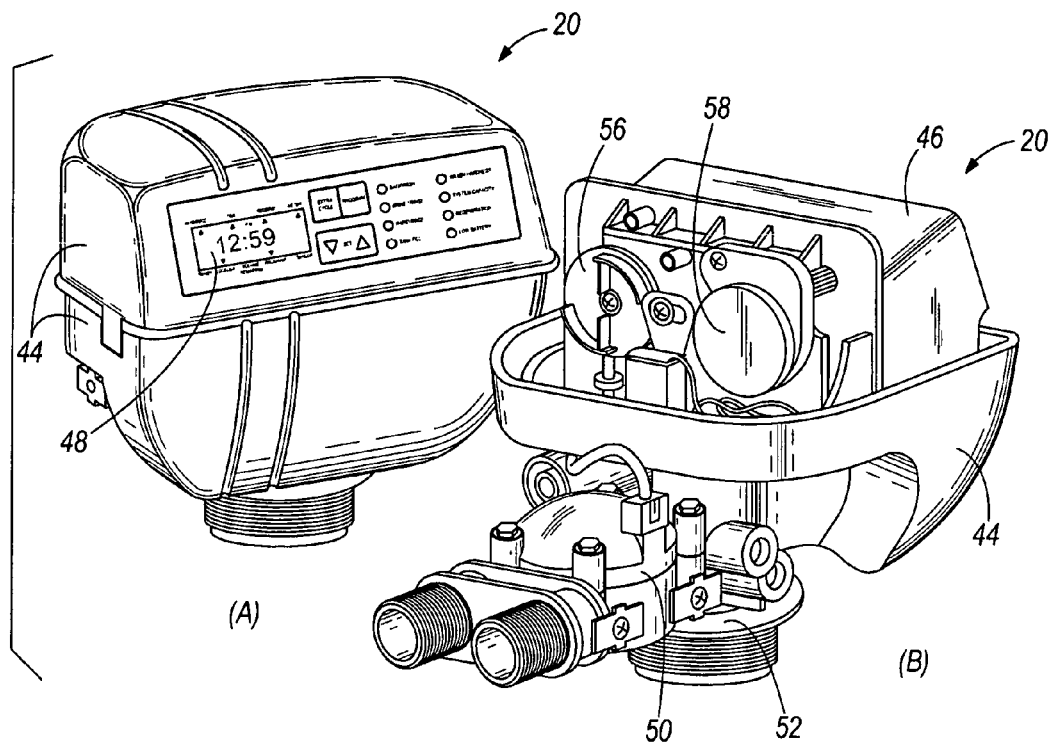
FIGS. 3A and 3B are perspective views of a controller for use with the filtration system of FIG. 1 or FIG. 2.
Figure 5:
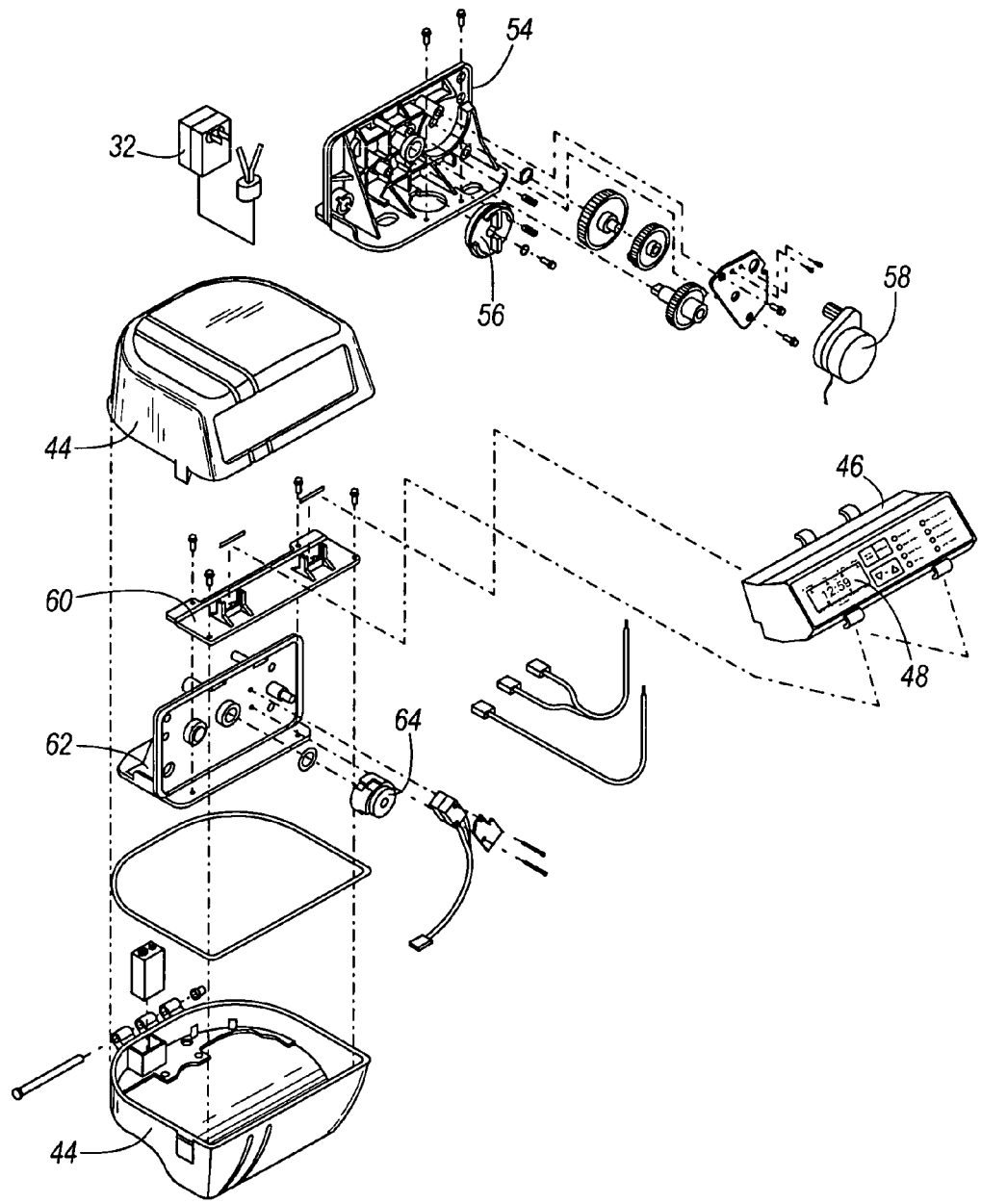
FIG. 5 is an exploded perspective view of the controller of FIGS. 3A and 3B.

FIGS. 3A, 3B, and 5 illustrate one embodiment of a controller 20 (or valve powerhead assembly), including a housing 44, a circuit board housing 46, a display 48, a flow meter 50, a control valve 52, a bypass valve cam 56, and a drive motor 58. As shown in FIG. 5, the controller 20 can also include a first drive panel 54, a mounting plate 60, a second drive panel 62, and a cycle cam 64. The controller 20 can also include various gears, seals, fasteners, and electrical connections or devices. In some embodiments, the controller 20 and the control valve 52 are coupled to the top of a vessel for the water softener 16 and/or the media filter 18.

Figure 4:
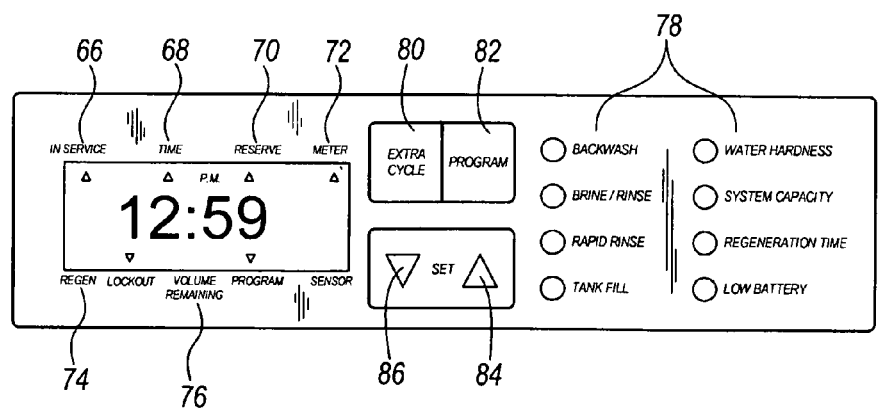
FIG. 4 is a schematic view of a display for use with the controller of FIGS. 3A and 3B.

FIG. 4 illustrates the display 48 of the controller 20. The display 48 can include one or more of the following indicators: an in service indicator 66, a time of day indicator 68, a reserve indicator 70, a flow meter indicator 72, a regeneration indicator 74, and a volume remaining indicator 76. The display 48 can include lights 78 corresponding to one or more of the following conditions: backwash, brine/rinse, rapid rinse, tank fill, water hardness, system capacity, regeneration time, and low battery. The display 48 can include one or more of the following buttons: an extra cycle button 80, a program button 82, a set up button 84, and a set down button 86. The display 48 can also include indicators, lights, and/or buttons related to the state of the membrane filter 12 and the valve 14 (e.g., an indicator regarding whether the membrane filter 12 is currently being flushed).

Figure 6:
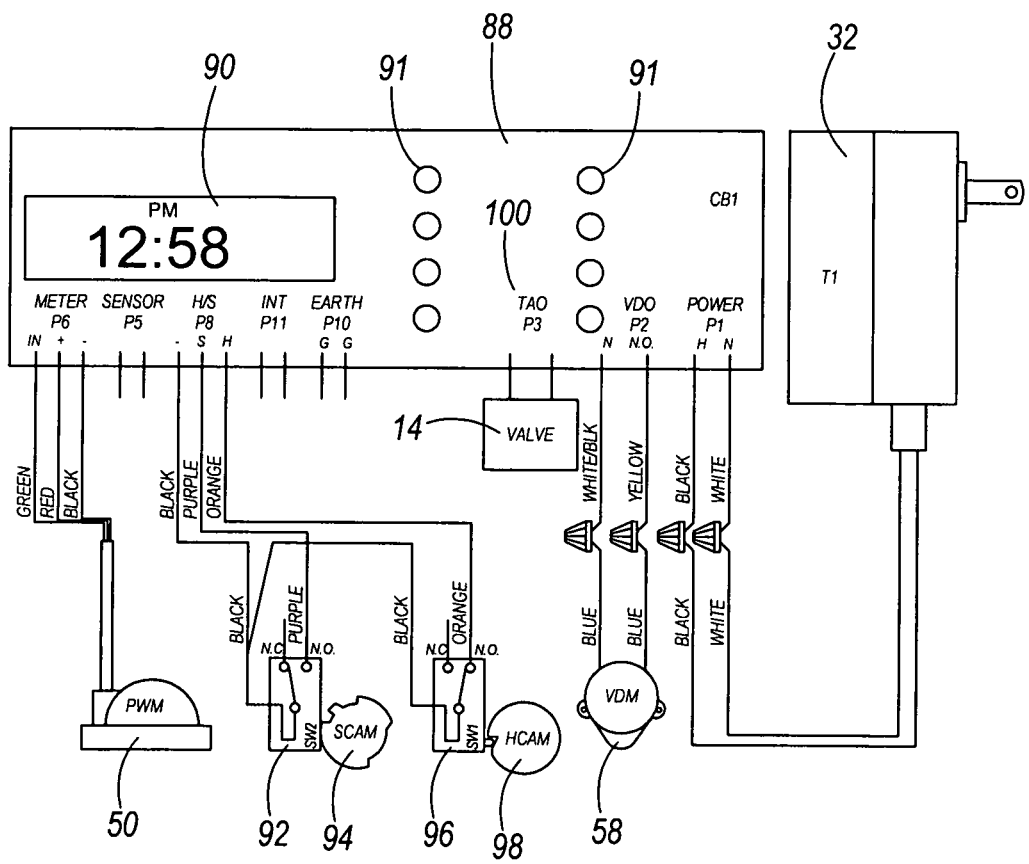
FIG. 6 is one embodiment of a wiring diagram for use in the filtration system of FIG. 1 or FIG. 2.
Figure 7:
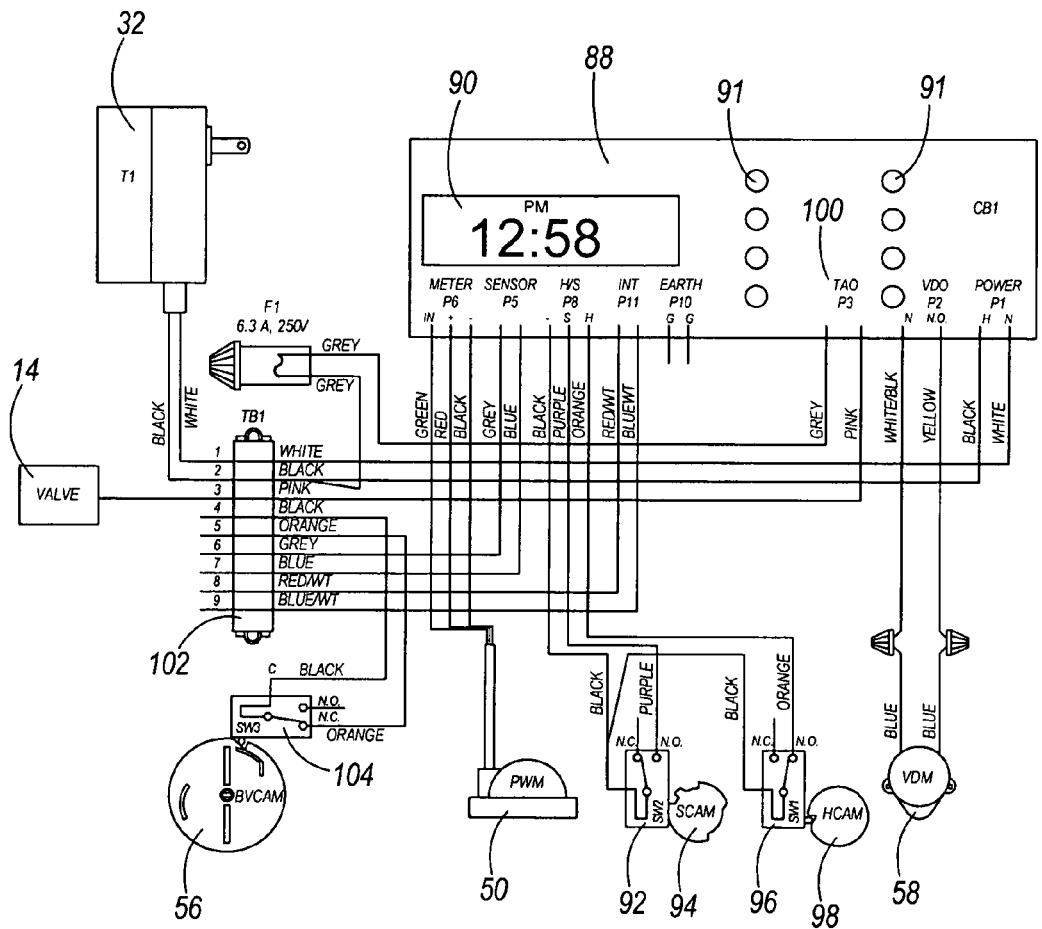
FIG. 7 is another embodiment of a wiring diagram for use in the filtration system of FIG. 1 or FIG. 2.

FIG. 6 is a wiring diagram for one embodiment of the controller 20. The controller 20 can include a timer circuit board 88. The timer circuit board 88 can include a processor (not shown), an alphanumeric display 90, and several holes 91 for the lights 78. The timer circuit board 88 can be coupled to the flow meter 50 (e.g., a paddle wheel flow meter), a step switch 92 and a step cam 94, a homing switch 96 and a homing cam 98, and the valve drive motor 58. The timer circuit board 88 can include a switch (such as a relay) connected to the valve 14 (such as a solenoid flushing valve) to control the flushing of the membrane filter 12. In one embodiment, the timer circuit board 88 can include a timed auxiliary output (TAO) 100 electrically connected to the switch and the valve 14. In another embodiment, as shown in FIG. 7, the controller 20 can include a terminal strip 102 electrically connected to the switch and the valve 14. FIG. 7 also illustrates the bypass valve cam 56 and a bypass valve switch 104. Rather than or in addition to the valve 14, the timed auxiliary output (TAO) 100 can be used to connect other auxiliary valves, sensors, or devices to the controller 20.

Various features and advantages of the invention are set forth in the following claims.

The invention claimed is:

1. A filtration system comprising:
   a membrane filter including filtration media to filter microbiological contaminants;
   a valve coupled to the membrane filter;
   at least one of a water softener or a media filter, the media filter including at least one of a carbon filter or an iron filter; and
   a controller coupled to the membrane filter and coupled to the at least one of the water softener or the media filter, the controller including a flow meter, a processor, and a switch,
   the flow meter fluidly coupled in series to the membrane filter and the at least one of the water softener or the media filter,
   the processor controlling flushing of the membrane filter and regeneration of the at least one of the water softener or the media filter,
   the switch electrically connected to the valve, the processor causing the switch to flush the membrane filter only when the at least one of the water softener or the media filter is not being regenerated.

2. The filtration system of claim 1 wherein the controller causes the switch to close based on a flow signal from the flow meter.

3. The filtration system of claim 1 wherein the controller includes a timer circuit, and wherein the controller causes the at least one of the water softener or the media filter to be regenerated based on a timer signal from the timer circuit.

4. The filtration system of claim 1 wherein the membrane filter is at least one of an ultrafiltration device or a microfiltration device.

5. The filtration system of claim 1 wherein the at least one of the water softener or the media filter includes an ion exchange vessel.

6. The filtration system of claim 1 wherein the valve includes a solenoid.

7. The filtration system of claim 1 wherein the controller includes a single flow meter and a single transformer for the membrane filter and the at least one of the water softener or the media filter.

8. The filtration system of claim 1 wherein the switch includes a relay.

9. The filtration system of claim 1 wherein the flow meter includes one of a paddle wheel and a turbine.

10. The filtration system of claim 1 wherein the membrane filter removes particles having a size of less than about one tenth of a micron.

11. The filtration system of claim 1 wherein the membrane filter is a capillary style membrane filter with a plurality of hollow fibers that are cleaned by periodic flushing.

12. The filtration system of claim 1 wherein the membrane filter removes viruses and bacteria.

13. The filtration system of claim 1 wherein for every predetermined number of gallons of flow, the controller causes the membrane filter to be flushed for a predetermined time period.

14. The filtration system of claim 1 wherein the processor has a timed auxiliary output electrically connected to the switch and the valve.

15. The filtration system of claim 1 wherein the controller includes a terminal strip electrically connected to the switch and the valve.

16. The filtration system of claim 1 wherein the membrane filter includes a pressure vessel.

17. The filtration system of claim 1 wherein the water softener and the media filter are combined in one vessel.

\* \* \* \* \*